United States Patent
Li (10) Patent No.: US 9,990,031 B2
(45) Date of Patent: Jun. 5, 2018

(54) INDICATING METHOD AND DEVICE FOR CORRECTING FAILURE OF MOTION-SENSING INTERACTION TRACKING

(71) Applicant: BOE Technology Group Co., Ltd., Beijing (CN)

(72) Inventor: Yingjie Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days. days.

(21) Appl. No.: 15/542,353

(22) PCT Filed: Oct. 21, 2016

(86) PCT No.: PCT/CN2016/102954
§ 371 (c)(1),
(2) Date: Jul. 7, 2017

(87) PCT Pub. No.: WO2017/124789
PCT Pub. Date: Jul. 27, 2017

(65) Prior Publication Data
US 2018/0067544 A1 Mar. 8, 2018

(30) Foreign Application Priority Data
Oct. 21, 2016 (CN) .......................... 2016 1 0030853

(51) Int. Cl.
*G06F 3/01* (2006.01)
*G06T 7/20* (2017.01)
*G06K 9/00* (2006.01)
(52) U.S. Cl.
CPC .......... *G06F 3/011* (2013.01); *G06K 9/00342* (2013.01); *G06T 7/20* (2013.01)
(58) Field of Classification Search
CPC ........ G06F 3/011; G06K 9/00342; G06T 7/20
(Continued)

(56) References Cited

U.S. PATENT DOCUMENTS 7,961,174 B1 6/2011 Markovic et al.
2011/0175810 A1 7/2011 Markovic et al.
(Continued)

FOREIGN PATENT DOCUMENTS

CN 102129292 A 7/2011
CN 102129293 A 7/2011
(Continued)

OTHER PUBLICATIONS

Feb. 6, 2017—International Search Report and Written Opinion Appn PCT/2016CN/102954 with Eng Tran.
(Continued)

*Primary Examiner* — Amandeep Saini
(74) *Attorney, Agent, or Firm* — Banner & Witcoff, Ltd.

(57) ABSTRACT

An indicating method and device for correcting failure of motion-sensing interaction tracking. The method includes: acquiring physical space coordinates of a border of an actual motion-sensing interaction range of a human body and physical space coordinates of one or more key-part points in the human body; if a failure of motion-sensing interaction tracking is determined, obtaining, a current position of the human body relative to the border of the actual motion-sensing interaction range based on the physical space coordinates of the border of the actual motion-sensing interaction range and a physical space coordinate of at least one key-part point from the one or more key-part points acquired in a latest time; and scaling down the border of the actual motion-sensing interaction range and a distance of the current position relative to the border of the actual motion-sensing interaction range, and displaying at a display interface through an auxiliary image.

17 Claims, 5 Drawing Sheets (58) Field of Classification Search
USPC .......................................................... 382/103
See application file for complete search history.

(56) References Cited

U.S. PATENT DOCUMENTS

2014/0037138 A1*  2/2014  Sato ................... G06K 9/00805
                                                            382/103
2016/0091966 A1    3/2016  Li et al.

FOREIGN PATENT DOCUMENTS

| | | |
|---|---|---|
| CN | 102184020 A | 9/2011 |
| CN | 102426480 A | 4/2012 |
| CN | 102486676 A | 6/2012 |
| CN | 103777748 A | 5/2014 |
| CN | 103988150 A | 8/2014 |
| CN | 104363435 A | 2/2015 |
| CN | 105718052 A | 6/2016 |
| WO | 2014066908 A1 | 5/2014 |

OTHER PUBLICATIONS

May 11, 2011—Experience Report of XBOX360 Kinect Motion Sensing Game Application Set, soomal.com, with Eng Tran.
Jan. 2, 2018—(CN) First Office Action Appn 201610030853.9 with English Tran.

* cited by examiner

FIG. 8 ical Field

INDICATING METHOD AND DEVICE FOR CORRECTING FAILURE OF MOTION-SENSING INTERACTION TRACKING

The application is a U.S. National Phase Entry of International Application No. PCT/CN2016/102954 filed on Oct. 21, 2016, designating the United States of America and claiming priority to Chinese Patent Application No. 201610030853.9 filed on Jan. 18, 2016. The present application claims priority to and the benefit of the above-identified applications and the above-identified applications are incorporated by reference herein in their entirety.

TECHNICAL FIELD

Embodiments of the present disclosure relate to an indicating method and device for correcting failure of motion-sensing interaction tracking.

BACKGROUND

With the rapid development of scientific technology, human-machine interaction modes are not limited to through a mouse and/or a keyboard. A higher level human-machine interaction concept puts forward a huge demand on the interactive mode. Currently, speech recognition, motion sensing technologies and the like are research focuses of scientific researchers.

A new generation of motion sensing devices based on motion sensing technologies can rely on real-time capture of user actions to achieve an input function. As a motion sensing device does not interact by direct contact but interacts through a user's body actions directly. An interaction between the user and a terminal by this mode can improve the user's human-machine interaction experience.

At present, devices with a motion-sensing interaction function are more and more popular, and motion sensing technologies are also more and more applied in human-machine interaction, e.g., motion-sensing rehabilitation equipments and motion sensing games, etc. However, a motion sensing device has a high requirement on a use environment, including a distance, an ambient light or the user's clothes, as well as an angle, etc. Particularly in the use process, for instance, in processes of playing some motion sensing games, as a user is in a moving state, occasional failure of human body tracking is inevitable.

SUMMARY

In an aspect, embodiments of the present disclosure provide an indicating method for correcting failure of motion-sensing interaction tracking, comprising: acquiring physical space coordinates of a border of an actual motion-sensing interaction range of a human body on a ground and physical space coordinates of one or more key-part points in the human body; if a failure of motion-sensing interaction tracking is determined, obtaining, on the ground or a plane parallel to the ground, a current position of the human body relative to the border of the actual motion-sensing interaction range based on the physical space coordinates of the border of the actual motion-sensing interaction range and a physical space coordinate of at least one key-part point from the one or more key-part points acquired in a latest time; and scaling down the border of the actual motion-sensing interaction range and a distance of the current position relative to the border of the actual motion-sensing interaction range, and displaying at a preset position of a display interface through an auxiliary image.

In another aspect, embodiments of the present disclosure provide an indicating device for correcting failure of motion-sensing interaction tracking, comprising: an acquisition module, a processing module connected with the acquisition module, and a control module connected with both the acquisition module and the processing module.

The acquisition module is configured to acquire physical space coordinates of a border of an actual motion-sensing interaction range of the human body on a ground and physical space coordinates of one or more key-part points in the human body.

The processing module is configured to, if failure of motion-sensing interaction tracking is determined, obtain a current position of the human body relative to the border of the actual motion-sensing interaction range on the ground or a plane parallel to the ground based on the physical space coordinates of the border of the actual motion-sensing interaction range acquired by the acquisition module and a physical space coordinate of at least one key-part point from the one or more key-part points acquired in the latest time.

The control module is configured to scale down the border of the actual motion-sensing interaction range acquired by the acquisition module and a distance of the current position relative to the border of the actual motion-sensing interaction range obtained by the processing module, and to display at a preset position of a display interface through an auxiliary image.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings without making other inventive work.

Reference numerals of the accompanying drawings: 10—depth camera; 20—display interface; 30—auxiliary image; 40—a current position of a human body in an auxiliary image; 50—acquisition module; 60—processing module; 70—control module; 80—read module.

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

Embodiments of the present disclosure provide an indicating method and device for correcting failure of motion-sensing interaction tracking, which can achieve an objective of directing a user to correct rapidly in a case of failure of motion-sensing interaction tracking. The indicating method for correcting failure of motion-sensing interaction tracking provided by embodiments of the present disclosure can be applied in a motion sensing interaction device. The motion sensing interaction device, for instance, may include a terminal and a depth camera.

Figure 1:
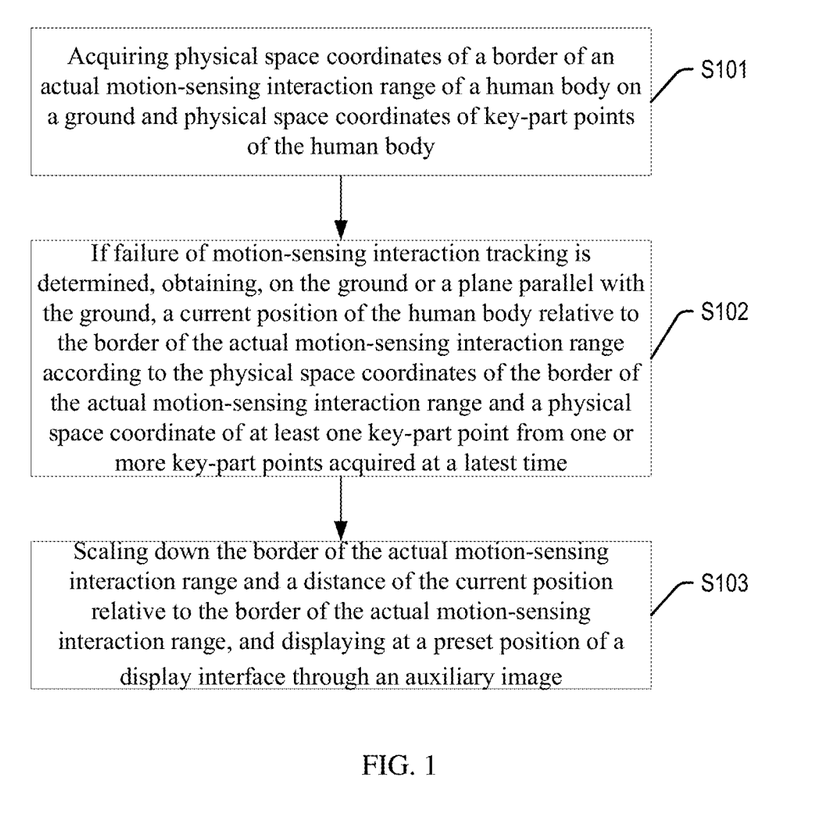
FIG. 1 is a flow diagram of an indicating method for correcting failure of motion-sensing interaction tracking provided by an embodiment of the present disclosure.

As shown in FIG. 1, the method comprises:

S101: acquiring physical space coordinates of a border of an actual motion-sensing interaction range of a human body on a ground and physical space coordinates of key-part points of the human body.

Herein, a depth camera may be adopted to acquire the physical space coordinates of the border of the actual motion-sensing interaction range of the human body on the ground and the physical space coordinates of the key-part points of the human body.

It should be understood that corresponding images cannot be captured in the case of failing to tracking motion-sensing interaction, that is, the physical space coordinates of the key-part points of the human body cannot be acquired. Thus, this step is performed in a normal process of motion sensing interaction tracking and to acquire the physical space coordinates of the border of the actual motion-sensing interaction range of the human body on the ground and the physical space coordinates of the key-part points of the human body.

A viewing angle of the depth camera has a certain range, and the depth camera has a maximum recognition distance and a minimum recognition distance. If a position of the human body is beyond an angular field of view of the depth camera, or the distance between the human body and the depth camera is less than the minimum recognition distance, or the distance between the human body and the depth camera is greater than the maximum recognition distance, the depth camera cannot acquire the physical space coordinates of the key-part points of the human body, and hence a normal motion sensing interaction cannot be performed. At this point, tracking of the motion sensing interaction fails.

In the disclosure, without conflict, the distance between the depth camera and the human body refers to a distance between a projection of the depth camera on the ground and a projection of the human body on the ground. The minimum recognition distance and the maximum recognition distance of the depth camera are related to the performance of the depth camera. Most depth cameras have a minimum recognition distance of about 0.5 m and a maximum recognition distance of about 3 m.

Figure 2:
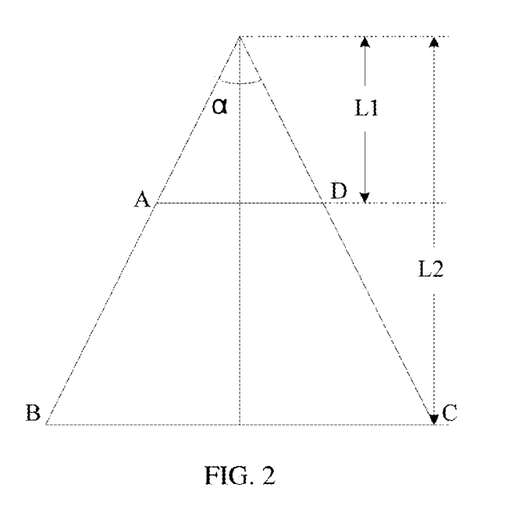
FIG. 2 is a schematic diagram illustrating a process of calculating an actual interaction range in an embodiment of the present disclosure.
Figure 3:
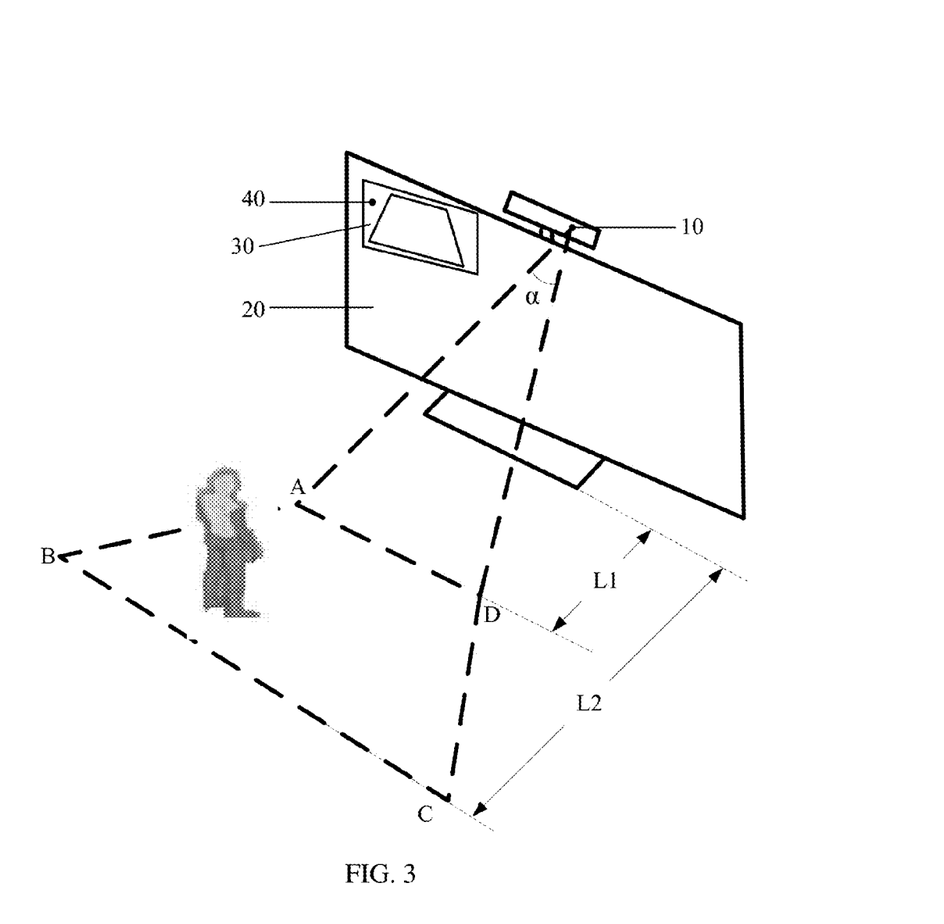
FIG. 3 is a schematic diagram of a motion-sensing interaction device and an interaction range in an embodiment of the present disclosure.

For instance, as the depth camera has a certain viewing angle, a minimum recognition distance and a maximum recognition distance, the obtained actual motion-sensing interaction range of the human body on the ground is a trapezoidal range. As shown in FIGS. 2 and 3, a length of an upper base AD, a length of a lower base BC and lengths of legs AB and CD of the trapezoidal range may be obtained by calculation according to the viewing angle a of a depth camera 10, a minimum distance L1 (namely a minimum recognition distance) and a maximum distance L2 (namely a maximum recognition distance) recognizable by the depth camera 10, so that the motion-sensing interaction range that the depth camera 10 can recognize can be obtained, that is, the trapezoidal range formed by ABCD can be obtained.

As shown in FIG. 2, $$AD = 2 \cdot \tan\frac{\alpha}{2} \cdot L1,$$

$$BC = 2 \cdot \tan\frac{\alpha}{2} \cdot L2,$$

$$AB = CD = \cos\frac{\alpha}{2} \cdot (L2 - L1).$$

For instance, the viewing angle of the depth camera is about 50°; the minimum distance L1 that the depth camera can recognize is 0.5 m; the maximum distance L2 that the depth camera can recognize is 3 m; and the following may be obtained by calculation:

$$AD = 2 \times \tan\frac{50}{2} \times 0.5 = 0.38 \text{ m},$$

$$BC = 2 \times \tan\frac{50}{2} \times 3 = 1.15 \text{ m},$$

$$AB = CD = \cos\frac{50}{2} \times (3 - 0.5) = 2.14 \text{ m}.$$

On this basis, the physical space coordinates of the trapezoidal border may be determined through the depth camera 10 according to the determined trapezoidal range. The physical space coordinates of the key-part points of the human body may also be acquired through the depth camera 10. For instance, the depth camera 10 captures images by frames, and a physical space coordinate of each key-part point on an image may be obtained according to the image acquired by the depth camera 10 by frame.

In an embodiment of the present disclosure, the key-part points of the human body are not limited. The key-part points may be joint points of the human body, e.g., joint points of the trunk of the human body, joint points of the head, joint points of the hands and joint points of the legs.

S102: if failure of motion-sensing interaction tracking is determined, obtaining, on the ground or a plane parallel with the ground, a current position of the human body relative to the border of the actual motion-sensing interaction range according to the physical space coordinates of the border of the actual motion-sensing interaction range and a physical space coordinate of at least one key-part point from one or more key-part points acquired at a latest time.

Herein, if the physical space coordinates of the key-part points of the human body cannot be acquired, failure of motion-sensing interaction tracking is determined.

For instance, the current position of the human body relative to the border of the actual motion-sensing interaction range may be obtained by only using a physical space coordinate of one key-part point. In this case, as the trunk and the head are in the middle of the human body and are the most suitable ones to represent the current position of the human body, a physical space coordinate of a point on the trunk of the human body or a point on the head acquired in the latest time may be adopted.

Or, physical space coordinates of two or more two key-part points may also be adopted. In this case, the physical space coordinates of the two or more key-part points may be averaged to obtain an average physical space coordinate.

The step of obtaining the current position of the human body relative to the border of the actual motion-sensing interaction range according to the physical space coordinate of the at least one key-part point from the one or more key-part points acquired in the latest time includes: firstly, obtaining a current physical space coordinate of the at least one key-part point at this time; and secondly, on the basis of the current physical space coordinate of the at least one key-part point at this time, obtaining the current position of the human body relative to the border of the actual motion-sensing interaction range by projecting the current physical space coordinate of the at least one key-part point at this time and the physical space coordinates of the border of the actual motion-sensing interaction range on the ground or the plane parallel to the ground.

It should be noted that: firstly, in the process of normal motion-sensing interaction tracking, the physical space coordinates of the key-part points acquired each time may be recorded, or, only the physical space coordinates of the key-part points acquired in the latest time are recorded before the acquisition of the physical space coordinates of the key-part points at a current time.

Secondly, the average physical space coordinate is the physical space coordinate obtained after the respective averaging of x values, y values and z values of the two or more two key-part points.

It should be noted that the physical space coordinates of the one or more key-part points acquired in the latest time may refer to physical space coordinates of one or more key-part points acquired from one image frame that is closest to the current moment. For instance, as the depth camera captures the images by frames, a physical space coordinate of each key-part point may be obtained from each image frame. Supposing that the current moment is t, images $F_1, F_2, \ldots, F_{n-1}$, and $F_n$ have been captured in sequence before the current moment t, and an image to be acquired after the current moment t is $F_{n+1}$. With respect to the current moment t, "the physical space coordinates of the one or more key-part points acquired in the latest time" refers to: physical space coordinates of one or more key-part points acquired from the image $F_n$ that is closest to the current moment t; and "physical space coordinates of the one or more key-part points acquired at a time before the latest time" refers to: physical space coordinates of one or more key-part points acquired from the image $F_{n-1}$ (the image $F_{n-1}$ is one image frame before the latest image frame $F_n$).

S103: scaling down the border of the actual motion-sensing interaction range and a distance of the current position relative to the border of the actual motion-sensing interaction range, and displaying at a preset position of a display interface through an auxiliary image.

Herein, the auxiliary image may be displayed on a display interface of a terminal.

A zooming-out scale is not limited in the embodiments of the present disclosure. For instance, the border of the actual motion-sensing interaction range and the distance of the current position relative to the border of the actual motion-sensing interaction range may be simultaneously reduced by $1/10$, $1/15$, $1/20$, etc. Herein, it should be noted that the zooming-out scale is also relevant to the size of the auxiliary image. As the border of the actual motion-sensing interaction range and the distance of the current position relative to the border of the actual motion-sensing interaction range are scaled down and displayed at the preset position of the display interface on the terminal through the auxiliary image, in order to not affect the motion-sensing interaction process, an area occupied by the auxiliary image in the display interface shall not be too large, so that the zooming-out scale shall be reasonably set according to the size of the auxiliary image.

As shown in FIG. 3, an auxiliary image 30 may be disposed on a top left corner of a display interface 20 and, of course, may also be displayed on a lower left corner, a top right corner, a lower right corner or the like, as long as the motion-sensing interaction process may not be affected.

In the auxiliary image 30, a current position 40 of the human body may be specified by a specific mark, for instance, a black point.

In an embodiment of the present disclosure, in the motion-sensing interaction process, by acquisition of the physical space coordinates of the border of the actual motion-sensing interaction range and the physical space coordinates of the key-part points of the human body, in the case of failing to track motion-sensing interaction, the current position of the human body relative to the border of the actual motion-sensing interaction range on the ground or a plane parallel to the ground may be obtained according to the physical space coordinates of the border of the actual motion-sensing interaction range and the physical space coordinate of the at least one key-part point from the key-part points acquired in the latest time. The border of the actual motion-sensing interaction range and the distance of the current position relative to the border of the actual motion-sensing interaction range can be scaled down and displayed on the display interface in the form of an auxiliary image. Thus, the current position of the human body relative to the border of the actual motion-sensing interaction range may be intuitively given to the user on the basis of the display of the auxiliary image, so that the user can rapidly adjust his/her own position or manually (by the user or other people) adjust the angle of the depth camera on this basis. Hence, normal motion-sensing interaction tracking can be restored. Therefore, the embodiments of the present disclosure can achieve the objective of directing the user to correct rapidly in the case of failure of motion-sensing interaction tracking.

For instance, in the case of failure of motion-sensing interaction tracking, after the auxiliary image is displayed on the display interface of the terminal, the method further comprises: sending a message to prompt the user to move, e.g., sending a text message or a voice message. Thus, the user can be further directed to correct rapidly in the case of failure of motion-sensing interaction tracking.

For instance, before performing motion sensing interaction, the method further comprises: reading parameters of the auxiliary image. The parameters of the auxiliary image include: a position and a size of the auxiliary image, whether the auxiliary image is always displayed, and an automatic disappearing delay time. The parameters can be displayed on the display interface of the terminal, so that the user can set the parameters. The parameters of the auxiliary image can be stored as the latest configuration data if reconfiguration data of the parameters is received; otherwise, the setting of the parameters of the auxiliary image can be exited.

It should be noted that: firstly, the position of the auxiliary image is the preset position.

Secondly, the size of the auxiliary image is not limited and may be reasonably set according to the size of the display interface without affecting motion sensing interaction. The occupied area of the auxiliary image may be ⅓ or less of the area of the display interface, for instance, ⅕.

Thirdly, the auxiliary image may be displayed all the time and may also be displayed only in the case of failing to track motion-sensing interaction. For instance, the automatic disappearing delay time can only be set when the user selects to display the auxiliary image only in the case of failing to track motion-sensing interaction. For instance, the automatic disappearing delay time may be zero. In this case, in the normal process of motion-sensing interaction tracking, the auxiliary image disappears immediately. The automatic disappearing delay time may also be not zero, for instance, may be 5 s, 10 s, etc. In this case, after normal motion-sensing interaction tracking is performed, the auxiliary image disappears after being displayed for a corresponding setting time (e.g., after 5 s or 10 s).

In the embodiments of the present disclosure, as the display mode of the auxiliary image may be selected according to the user's preferences, the user experience can be improved.

Moreover, if a parameter of the auxiliary image is set to be always displayed, the auxiliary image is displayed at the preset position of the display interface on the terminal all the time; or if the parameter of the auxiliary image is set to be not always displayed and the automatic disappearing delay time is not zero, the auxiliary image is displayed at the preset position of the display interface on the terminal within the automatic disappearing delay time, and disappears from the display interface of the terminal after the automatic disappearing delay time elapses. In a normal process of motion-sensing interaction tracking, the current position of the human body relative to the border of the actual motion-sensing interaction range on the ground or a plane parallel to the ground is obtained according to the physical space coordinates of the border of the actual motion-sensing interaction range and the current physical space coordinate of the at least one key-part point from the key-part points.

Herein, in the normal process of motion-sensing interaction tracking, according to the current physical space coordinate of the at least one key-part point, the current position of the human body relative to the border of the actual motion-sensing interaction range may be obtained by projecting the current physical space coordinate of the at least one key-part point and the physical space coordinates of the border of the actual motion-sensing interaction range on the ground or the plane parallel to the ground. On this basis, the auxiliary image can be displayed at the preset position of the display interface on the terminal after the border of the actual motion-sensing interaction range and the distance of the current position relative to the border of the actual motion-sensing interaction range are scaled down.

On this basis, the step S102 may include:

in the case of failure of motion-sensing interaction tracking, if it is determined that the human body is currently located within the border of the actual motion-sensing interaction range, then taking a position of the human body relative to the border of the actual motion-sensing interaction range on the ground or the plane parallel to the ground which is obtained in the latest time as the current position, according to the physical space coordinates of the border of the actual motion-sensing interaction range and the physical space coordinate of the at least one key-part point from the key-part points acquired in the latest time; and if it is determined that the human body is currently located outside the border of the actual motion-sensing interaction range, calculating a current physical space coordinate of the at least one key-part point in the human body at this point according to the physical space coordinate of the at least one key-part point acquired in the latest time and a moving direction of the human body, and obtaining the current position of the human body relative to the border of the actual motion-sensing interaction range on the ground or the plane parallel to the ground.

For instance, whether the human body is currently located within the actual motion-sensing interaction range may be determined according to the physical space coordinate of one key-part point (for instance, a joint point of the trunk or a joint point of the head) from the key-part points acquired in the latest time or an average physical space coordinate obtained by the averaging of physical space coordinates of a plurality of key-part points acquired in the latest time.

Herein, no limitation will be given to the method of determining whether the human body is currently located within the actual motion-sensing interaction range according to the physical space coordinate of the at least one key-part point from the key-part points acquired in the latest time.

In the embodiments of the present disclosure, based on the physical space coordinates of the border of the actual motion-sensing interaction range of the human body on the ground, and the physical space coordinate of the one key-part point (for instance, the joint point of the trunk) acquired in the latest time, or the average physical space coordinate of the plurality of key-part points acquired in the latest time, the position of the human body relative to the border of the actual motion-sensing interaction range in the latest time may be obtained by converting these physical space coordinates into two-dimensional (2D) coordinates disposed on the ground or the plane parallel to the ground.

For instance, the position of the human body relative to the border of the actual motion-sensing interaction range in the latest time may be taken as the current position, namely, the current physical space coordinates of the key-part points of the human body are the physical space coordinates of the key-part points of the human body acquired in the latest time.

It should be noted that: the at least one key-part point from the key-part points adopted in the embodiments of the present disclosure can be a same key-part point from beginning to end.

Moreover, based on the physical space coordinate of the at least one key-part point acquired in the latest time, a circular range can be obtained by taking the average physical space coordinate of the at least one key-part point as a center and taking a maximum moving distance that a common human body can move within the time period of acquiring each image frame by the depth camera as a radius. Based on the physical space coordinates of the border of the actual motion-sensing interaction range, if the circular range is located within the border of the actual motion-sensing interaction range, it is determined that the human body is currently located within the border of the actual motion-sensing interaction range, and a position of the human body relative to the border of the actual motion-sensing interaction range that is obtained in the latest time on the ground or the plane parallel to the ground can be taken as the current position of the human body.

Based on this, the user can know that he/she is not beyond the actual motion-sensing interaction range from the auxiliary image. Hence, it can be determined that: if the user is not recognized, the reason may be a nonstandard action or there is a light problem or system problem. In this case, the user can move slightly or adjust the light to see whether a normal tracking can be performed.

For instance, a circular range may be obtained based on a physical space coordinate of one key-part point (for instance, a joint point of the trunk or a joint point of the head) from the key-part points acquired in the latest time. The circular range takes the physical space coordinate of the one key-part point as the center of the circular range and a maximum moving distance of a common human body within the time period of acquiring each image frame by the depth camera as a radius. In this case, the average physical space coordinate is the physical space coordinate of the one key-part point.

Or, the average physical space coordinate may be obtained by calculation based on physical space coordinates of at least two key-part points from the key-part points acquired in the latest time. A circular range is obtained by taking the average physical space coordinate as the center and the maximum moving distance of the common human body within the time period of acquiring each image frame by the depth camera as the radius.

When the circular range is obtained, physical space coordinates of the border of the circular range are also obtained.

Herein, it should be noted that, as known from a maximum moving speed of the common human body being about 10 m/s and a frequency of image acquisition of the depth camera being greater than 30 frames per second, the maximum moving distance of the common human body within the time period of acquiring each image frame by the depth camera is about 10×1/30≈0.3 m.

Description will be given below with reference to example embodiments.

If a physical space coordinate of a joint point of the trunk acquired by the depth camera in the latest time is (x, y, z), a circular range may be obtained on the plane parallel to the ground by taking (x, y, z) as the center and a maximum moving distance of a common human body, e.g., 0.3 m, as the radius. Whether the circular range is located within the actual motion-sensing interaction range may be determined by converting the physical space coordinates of the border of the circular range and the physical space coordinates of the border of the actual motion-sensing interaction range into 2D coordinates on the ground or a plane parallel to the ground. If the circular range is located within the border of the actual motion-sensing interaction range, it is determined that the human body is currently located within the border of the actual motion-sensing interaction range, so that a position of the human body relative to the border of the actual motion-sensing interaction range acquired in the latest time is taken as the current position of the human body. For instance, the position of the human body relative to the border of the actual motion-sensing interaction range acquired in the latest time may be obtained by projecting the physical space coordinate (x, y, z) of the joint point of the trunk acquired by the depth camera in the latest time and the physical space coordinates of the border of the actual motion-sensing interaction range on the ground or the plane parallel to the ground.

Moreover, if the circular range is not completely located within the border of the actual motion-sensing interaction range, the method further comprises: processing a current image acquired by the depth camera line by line; counting the number of points within a range of a maximum moving distance of the common human body during the time period of acquiring each image frame by the depth camera by taking a preset position in the current image as the center of the range of the maximum moving distance; determining that the human body is currently located within the border of the actual motion-sensing interaction range if a counting result is greater than a preset threshold, and otherwise, determining that the human body is currently located outside the actual motion-sensing interaction range. For instance, the preset position is a position corresponding to a point on the trunk in an image acquired by the depth camera in the latest time.

It should be noted that even in the case of failure of motion-sensing interaction tracking, the depth camera 10 can also capture corresponding images, but the images cannot be recognized.

Here, the preset threshold is not limited, as long as it can be determined that the human body is currently located within the border of the actual motion-sensing interaction range when the number of the counting points is greater than the preset threshold.

Whether the human body is located within the border of the actual motion-sensing interaction range may be more accurately determined in this embodiment of the present disclosure.

Based on the above description, if it is determined that the human body is currently located outside the actual motion-sensing interaction range, a current physical space coordinate of the at least one key-part point in the human body at this point may be obtained by calculation according to a physical space coordinate of the at least one key-part point acquired in the latest time, a moving direction of the human body and a maximum moving distance of the common human body within the time period of acquiring each image frame by the depth camera. The current position of the human body relative to the border of the actual motion-sensing interaction range on the ground or the plane parallel to the ground is obtained according to the current physical space coordinate of the at least one key-part point in the human body at this point.

The moving direction may be obtained by comparing a physical space coordinate of the at least one key-part point acquired in a latest time before failure of motion-sensing interaction tracking with a physical space coordinate of the at least one key-part point acquired in a time before the latest time.

It should be noted that even only physical space coordinates of the key-part points of the human body acquired in the latest time are recorded, the moving direction of the human body may also be obtained in the process of recording the current physical space coordinates of the key-part points of the human body at this time, based on the physical space coordinates of the key-part points of the human body acquired in the latest time.

Figure 4:
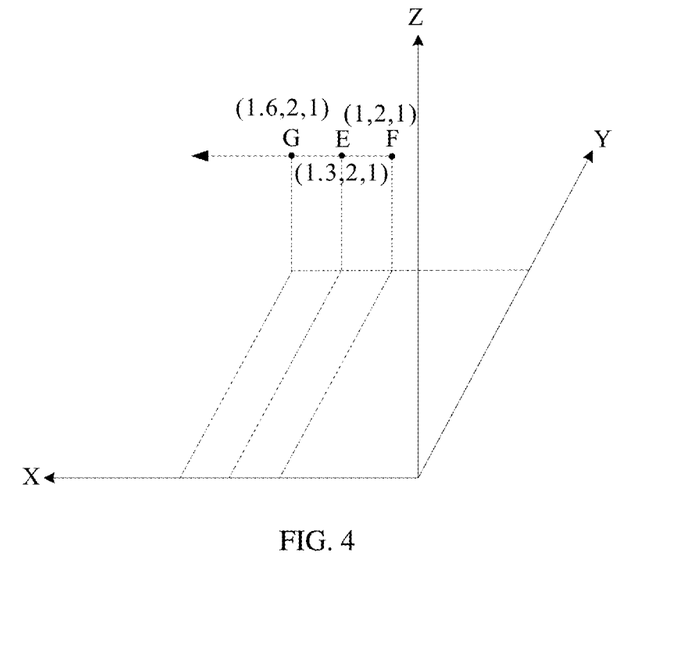
FIG. 4 is a schematic diagram illustrating a process of determining a moving direction of a human body and current physical space coordinates in an embodiment of the present disclosure.

Description is given here by taking a joint point of the trunk of the human body as an example. As shown in FIG. 4, before failure of motion-sensing interaction tracking, if a physical space coordinate E of the joint point of the trunk acquired in the latest time is (1.3, 2, 1) and a physical space coordinate F of the joint point of the trunk acquired in a time before the latest time is (1, 2, 1), it can be known that the human body moves along the X axis (as shown by a dotted line with an arrowhead in the figure) by comparing the two physical space coordinates acquired at these two times. As the maximum moving distance of the common human body within the time period of each image frame is 0.3 m, a current physical space coordinate G of the joint point of the trunk of the human body at this time is (1.6, 2, 1). A current position of the human body relative to the border of the actual motion-sensing interaction range may be obtained by projecting the current physical space coordinate G (1.6, 2, 1) of the joint point of the trunk of the human body at this point and the physical space coordinates of the border of the actual motion-sensing interaction range on the ground or the plane parallel to the ground.

Figure 5:
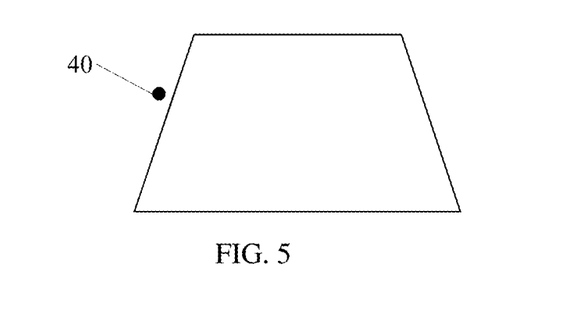
FIG. 5 is a schematic diagram of an auxiliary image in an embodiment of the present disclosure.

On this basis, as shown in FIG. 5, a black point in the figure represents a current position 40 of the human body in the auxiliary image, and the trapezoid represents the border of the actual motion-sensing interaction range. If the black point is below the trapezoid, the user may enter the trapezoidal range, namely entering the motion-sensing interaction range, by moving forward. If the black point is above the trapezoid, the user may enter the trapezoidal range by moving backward. If the black point is on the left of the trapezoid, the user may enter the trapezoidal range by moving to the right. If the black point is on the right of the trapezoid, the user may enter the trapezoidal range by moving to the left.

Figure 6:
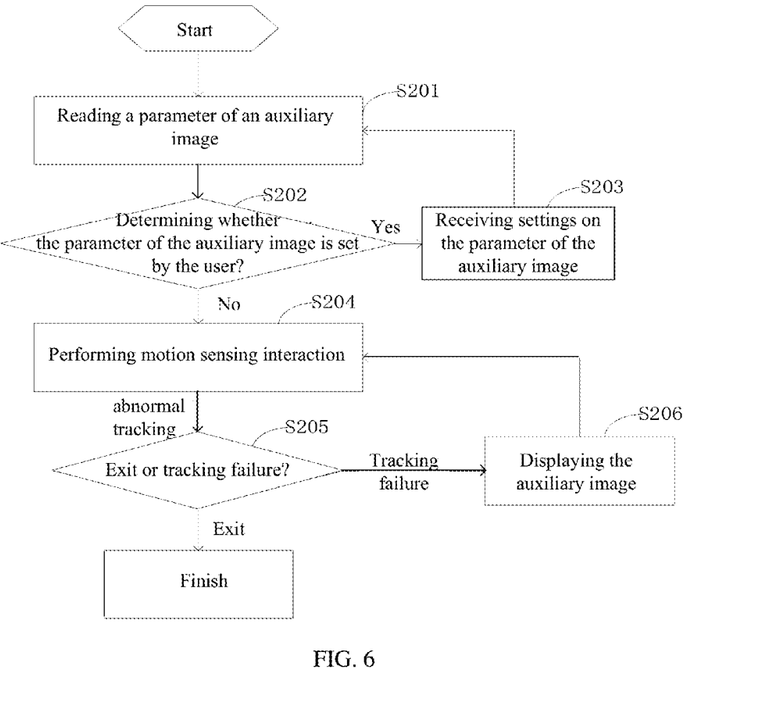
FIG. 6 is a flow diagram illustrating a process of setting and displaying an auxiliary image in an embodiment of the present disclosure.

An embodiment of the present disclosure provides a method for correcting failure of motion-sensing interaction tracking. As illustrated in FIG. 6, the method comprises:

S201: reading a parameter of an auxiliary image after a motion sensing interaction device is started.

For instance, the parameter of the auxiliary image includes: a position and a size of the auxiliary image, whether the auxiliary image is always displayed, and/or an automatic disappearing delay time.

S202: determining whether the parameter of the auxiliary image is set by the user; if so, executing S203, otherwise, executing S204.

Description is given in embodiments of the present disclosure by taking the case that the user selects that the auxiliary image is not always displayed and the automatic disappearing delay time is not zero as an example.

S203: receiving the user's settings on the parameter of the auxiliary image and storing the parameter as the latest set data.

S204: performing motion sensing interaction.

In a normal process of motion-sensing interaction tracking, a depth camera is adopted to acquire physical space coordinates of a border of an actual motion-sensing interaction range of the human body on the ground and physical space coordinates of joint points of the human body.

S205: when an abnormal tracking occurs, determining whether the abnormal tracking is to exit or a tracking failure.

In this process, if the normal tracking cannot be performed, namely the physical space coordinates of the joint points of the human body cannot be recognized, failure of motion-sensing interaction tracking can be determined, and S206 is executed. If it is determined to exit the program, the process is ended.

S206: displaying the auxiliary image. Subsequently, S204 is executed if the normal tracking is restored.

For instance, the current position of the human body relative to the border of the actual motion-sensing interaction range on the ground or the plane parallel to the ground is obtained according to the physical space coordinates of the border of the actual motion-sensing interaction range and the physical space coordinates of the joint points of the trunk acquired in the latest time; and the border of the actual motion-sensing interaction range and the distance of the current position relative to the border of the actual motion-sensing interaction range are scaled down and displayed at a preset position of a display interface of a terminal through the auxiliary image.

After normal tracking, the auxiliary image is still displayed during the automatic disappearing delay time.

At this point, the current position of the human body relative to the border of the actual motion-sensing interaction range on the ground or the plane parallel to the ground may be obtained according to the physical space coordinates of the border of the actual motion-sensing interaction range and current physical space coordinates of the joint points of the trunk at this point. The border of the actual motion-sensing interaction range and the distance of the current position relative to the border of the actual motion-sensing interaction range are scaled down and displayed at the preset position of the display interface of the terminal through the auxiliary image.

Figure 7:
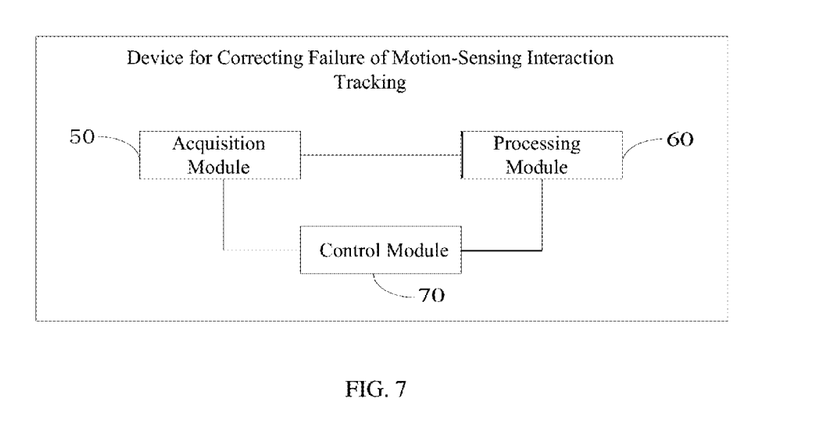
FIG. 7 is a first schematic diagram of an indicating device for correcting failure of motion-sensing interaction tracking provided by an embodiment of the present disclosure.

An embodiment of the present disclosure further provides a device for correcting failure of motion-sensing interaction tracking, which may be applied in a motion sensing interaction device. The motion sensing interaction device, for instance, may include a terminal and a depth camera. For instance, the device may be integrated into an operation control unit of the terminal.

As shown in FIG. 7, the device comprises: an acquisition module 50, a processing module 60 connected with the acquisition module 50, and a control module 70 connected with both the acquisition module 50 and the processing module 60.

The acquisition module 50 is configured to acquire physical space coordinates of a border of an actual motion-sensing interaction range of the human body on the ground and physical space coordinates of key-part points of the human body.

Herein, a depth camera may be adopted to acquire the physical space coordinates of the border of the actual motion-sensing interaction range of the human body on the ground and the physical space coordinates of the key-part points of the human body.

It should be understood that corresponding images cannot be captured in the case of failure of motion-sensing interaction tracking, namely the physical space coordinates of the key-part points of the human body cannot be acquired directly by the depth camera. Thus, this operation by the depth camera to acquire the physical space coordinates of the border of the actual motion-sensing interaction range of the human body on the ground and the physical space coordinates of the key-part points of the human body is performed in the normal process of motion-sensing interaction tracking.

As the depth camera has a certain viewing angle, a minimum recognition distance and a maximum recognition distance, the obtained actual motion-sensing interaction range of the human body on the ground is a trapezoidal range.

On this basis, the physical space coordinates of the trapezoidal border may be known through a depth camera 10 on the basis of the determined trapezoidal range. In addition, the physical space coordinates of the key-part points of the human body may also be acquired by the depth camera 10. The depth camera 10 captures images by frames, and a physical space coordinate of each key-part point on an image may be obtained on the basis of the image captured in a frame.

In the embodiments of the present disclosure, the key-part points of the human body are not limited and may be joint points of the human body, e.g., joint points of the trunk of the human body, joint points of the head, joint points of a hand and joint points of a leg, etc.

The processing module 60 is configured to: if failure of motion-sensing interaction tracking is determined, obtain a current position of the human body relative to the border of the actual motion-sensing interaction range on the ground or the plane parallel to the ground according to the physical space coordinates of the border of the actual motion-sensing interaction range acquired by the acquisition module 50 and a physical space coordinate of at least one key-part point from the key-part points acquired in the latest time.

For instance, the current position of the human body relative to the border of the actual motion-sensing interaction range may be obtained by only adoption of a physical space coordinate of one key-part point. In this case, as the trunk and the head are in the middle of the human body and are the most suitable ones to represent the current position of the human body, a physical space coordinate of a point on the trunk of the human body or a point on the head acquired in the latest time may be used.

Or, physical space coordinates of two or more key-part points may also be used. In this case, physical space coordinates of two or more key-part points may be averaged to obtain an average physical space coordinate.

The step of obtaining the current position of the human body relative to the border of the actual motion-sensing interaction range according to the physical space coordinate of the at least one key-part point from the key-part points acquired in the latest time includes: firstly, obtaining a current physical space coordinate of the at least one key-part point at this time; and secondly, on the basis of the current physical space coordinate of the at least one key-part point at this time, obtaining the current position of the human body relative to the border of the actual motion-sensing interaction range by projecting the current physical space coordinate of the at least one key-part point at this time and the physical space coordinates of the border of the actual motion-sensing interaction range on the ground or the plane parallel to the ground.

The control module 70 is configured to scale down the border of the actual motion-sensing interaction range acquired by the acquisition module 50 and a distance of the current position relative to the border of the actual motion-sensing interaction range obtained by the processing module 60, and to display at a preset position of a display interface through an auxiliary image.

Here, the auxiliary image may be displayed on a display interface of a terminal.

The auxiliary image may be set on the top left corner of the display interface and, of course, may also be displayed on the lower left corner, the top right corner, the lower right corner or the like, as long as the motion-sensing interaction process cannot be affected. In the auxiliary image, the current position of the human body may be specified with a specific mark.

In an embodiment of the present disclosure, in the normal motion-sensing interaction process, the acquisition module 50 adopts a depth camera to acquire the physical space coordinates of the border of the actual motion-sensing interaction range and the physical space coordinates of the key-part points of the human body. In a case of failure of motion-sensing interaction tracking, the processing module 60 may obtain the current position of the human body relative to the border of the actual motion-sensing interaction range on the ground or the plane parallel to the ground according to the physical space coordinates of the border of the actual motion-sensing interaction range and the physical space coordinate of the at least one key-part point from the key-part points acquired in the latest time. On this basis, the control module 70 is adopted to scale down the border of the actual motion-sensing interaction range and the distance of the current position relative to the border of the actual motion-sensing interaction range and to display on the display interface in the form of the auxiliary image. Thus, the current position of the human body relative to the border of the actual motion-sensing interaction range may be intuitively given on the basis of the display of the auxiliary image, so that the user can rapidly adjust his/her own position or manually (by the user or other people) the angle of the depth camera is adjusted. Thus, normal motion sensing interaction tracking can be performed. Therefore, the embodiments of the present disclosure can achieve the objective of directing the user to correct rapidly in the case of failure of motion-sensing interaction tracking.

For instance, the control module 70 is also configured to send via the terminal a message to prompt the user to move in the case of failure of motion-sensing interaction tracking and after the display of the auxiliary image on the display interface of the terminal.

Figure 8:
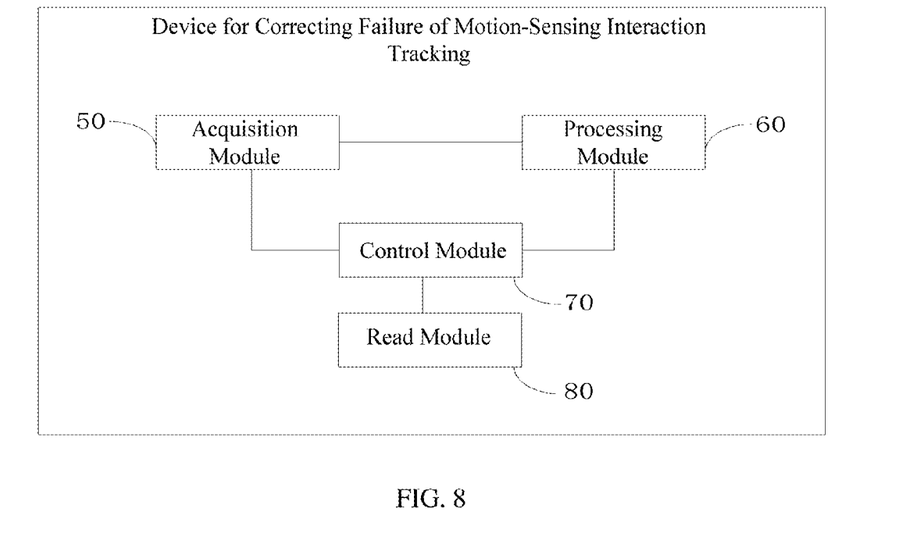
FIG. 8 is a second schematic diagram of an indicating device for correcting failure of motion-sensing interaction tracking provided by an embodiment of the present disclosure.

For instance, as shown in FIG. 8, the correcting device further comprises a read module 80 connected with the control module 70. The read module 80 is configured to read parameters of the auxiliary image before motion sensing interaction. The parameters of the auxiliary image include: the position and the size of the auxiliary image, whether the auxiliary image is always displayed, and the automatic disappearing delay time.

On this basis, the control module 70 is also configured to display the parameters through the display interface of the terminal, so that the user can set the parameters. If resetting data of the parameters is received, the parameters of the auxiliary image are stored as the latest resetting data; otherwise, the setting of the parameters of the auxiliary image is exited.

Herein, according to the user's selection, the auxiliary image may be always displayed and may also be displayed only in the case of failure of motion-sensing interaction tracking. For instance, the automatic disappearing delay time can only be set when the user selects to display the auxiliary image only in the case of failure of motion-sensing interaction tracking. For instance, the automatic disappearing delay time may be zero. In this case, in the normal process of motion-sensing interaction tracking, the auxiliary image disappears immediately. The automatic disappearing delay time may also be not zero, for instance, may be 5 s, 10 s, etc. In this case, after normal motion sensing interaction tracking, the auxiliary image disappears after being displayed for corresponding setting time.

In the embodiments of the present disclosure, as the display mode of the auxiliary image may be selected according to the user's preferences, the user experience can be improved.

Moreover, if a parameter of the auxiliary image is set to be always displayed, the control module 70 displays the auxiliary image at the preset position of the display interface of the terminal all the time; or, if the parameter of the auxiliary image is set to be not always displayed and the automatic disappearing delay time is not zero, the control module 70 displays the auxiliary image at the preset position of the display interface of the terminal within the automatic disappearing delay time.

On this basis, the processing module 60 is also configured to, in the normal process of motion-sensing interaction tracking, obtain the current position of the human body relative to the border of the actual motion-sensing interaction range on the ground or the plane parallel to the ground according to the physical space coordinates of the border of the actual motion-sensing interaction range and the current physical space coordinate of the at least one key-part point in the key-part points at this time.

Here, in the normal process of motion-sensing interaction tracking, on the basis of the physical space coordinate of the at least one key-part point at this time, the processing module 60 may obtain the current position of the human body relative to the border of the actual motion-sensing interaction range by projecting the current physical space coordinate of the at least one key-part point at this time and the physical space coordinates of the border of the actual motion-sensing interaction range on the ground or the plane parallel to the ground. On this basis, the control module 70 may display the auxiliary image at the preset position of the display interface of the terminal after the border of the actual motion-sensing interaction range and the distance of the current position relative to the border of the actual motion-sensing interaction range are scaled down.

Based on the above description, in the case of failure of motion-sensing interaction tracking, the processing module 60 is also configured to: if it is determined that the human body is currently located within the border of the actual motion-sensing interaction range, take a position of the human body relative to the border of the actual motion-sensing interaction range on the ground or the plane parallel to the ground which is obtained in the latest time as the current position, according to the physical space coordinates of the border of the actual motion-sensing interaction range and the physical space coordinate of the at least one key-part point from the key-part points acquired in the latest time; and if it is determined that the human body is currently located outside the border of the actual motion-sensing interaction range, calculate a current physical space coordinate of the at least one key-part point in the human body at this point according to the physical space coordinate of the at least one key-part point acquired in the latest time and a moving direction of the human body, and obtain the current position of the human body relative to the border of the actual motion-sensing interaction range on the ground or the plane parallel to the ground.

For instance, whether the human body is currently located within the actual motion-sensing interaction range may be determined according to the physical space coordinate of one key-part point (for instance, a joint point of the trunk or a joint point of the head) from the key-part points acquired in the latest time or an average physical space coordinate obtained by the averaging of physical space coordinates of a plurality of key-part points acquired in the latest time.

Herein, no limitation will be given to the method of determining whether the human body is currently located within the actual motion-sensing interaction range according to the physical space coordinate of the at least one key-part point from the key-part points acquired in the latest time.

In the embodiments of the present disclosure, based on the physical space coordinates of the border of the actual motion-sensing interaction range of the human body on the ground, and the physical space coordinate of the one key-part point (for instance, the joint point of the trunk) acquired in the latest time, or the average physical space coordinate of the plurality of key-part points acquired in the latest time, the position of the human body relative to the border of the actual motion-sensing interaction range in the latest time may be obtained by converting these physical space coordinates into two-dimensional (2D) coordinates on the ground or the plane parallel to the ground.

For instance, the position of the human body relative to the border of the actual motion-sensing interaction range in the latest time may be taken as the current position, namely, the current physical space coordinates of the key-part points of the human body are the physical space coordinates of the key-part points of the human body acquired in the latest time.

Moreover, the processing module 60 is configured to: based on the physical space coordinate of the at least one key-part point acquired in the latest time, obtain a circular range by taking the average physical space coordinate of the at least one key-part point as a center and taking a maximum moving distance that a common human body can move within the time period of acquiring each image frame by the depth camera as a radius. Based on the physical space coordinates of the border of the actual motion-sensing interaction range, if the circular range is located within the border of the actual motion-sensing interaction range, the processing module 60 determines that the human body is currently located within the border of the actual motion-sensing interaction range, and a position of the human body relative to the border of the actual motion-sensing interaction range that is obtained in the latest time on the ground or the plane parallel to the ground can be taken as the current position of the human body.

For instance, a circular range may be obtained based on a physical space coordinate of one key-part point (for instance, a joint point of the trunk or a joint point of the head) from the key-part points acquired in the latest time. The circular range takes the physical space coordinate of the one key-part point as the center of the circular range and a maximum moving distance of a common human body within the time period of acquiring each image frame by the depth camera as a radius. In this case, the average physical space coordinate is the physical space coordinate of the one key-part point.

Or, the average physical space coordinate may be obtained by calculation based on physical space coordinates of at least two key-part points from the key-part points acquired in the latest time. A circular range is obtained by taking the average physical space coordinate as the center and the maximum moving distance of the common human body within the time period of acquiring each image frame by the depth camera as the radius.

When the circular range is obtained, physical space coordinates of the border of the circular range are also obtained.

It should be noted that as known from a maximum moving speed of the common human body being about 10 m/s and a frequency of image acquisition of the depth camera being greater than 30 frames per second, the maximum moving distance of the common human body within the time period of acquiring each image frame by the depth camera is about $10 \times 1/30 \approx 0.3$ m.

Moreover, if the circular range is not completely located within the border of the actual motion-sensing interaction range, the processing module 60 is further configured to: processes a current image acquired by the depth camera line by line; count the number of points within a range of a maximum moving distance of the common human body during the time period of acquiring each image frame by the depth camera by taking a preset position in the current image as the center of the range of the maximum moving distance; determine that the human body is currently located within the border of the actual motion-sensing interaction range if a counting result is greater than a preset threshold, and otherwise, determine that the human body is currently located outside the actual motion-sensing interaction range, where the preset position is a position corresponding to a point on the trunk in an image acquired by the depth camera in the latest time.

It should be noted that even in the case of failure of motion-sensing interaction tracking, the depth camera 10 can also capture corresponding images, but the images cannot be recognized.

Based on the above description, if it is determined that the human body is currently located outside the actual motion-sensing interaction range, the processing module 60 is configured to: obtain a current physical space coordinate of the at least one key-part point in the human body at this point by calculation according to a physical space coordinate of the at least one key-part point acquired in the latest time, a moving direction of the human body and a maximum moving distance of the common human body within the time period of acquiring each image frame by the depth camera; obtain the current position of the human body relative to the border of the actual motion-sensing interaction range on the ground or the plane parallel to the ground according to the current physical space coordinate of the at least one key-part point in the human body at this point.

For instance, the moving direction may be obtained by comparing a physical space coordinate of the at least one key-part point acquired in a latest time before failure of motion-sensing interaction tracking with a physical space coordinate of the at least one key-part point acquired in a time before the latest time.

It should be noted that even only physical space coordinates of the key-part points of the human body acquired in the latest time are recorded, the moving direction of the human body may also be obtained in the process of recording the current physical space coordinates of the key-part points of the human body at this time, based on the physical space coordinates of the key-part points of the human body acquired in the latest time.

It should be understood that: all or part of the steps for implementing the method in the embodiments may be completed by hardware relevant to program instructions. The foregoing program may be stored in a computer-readable storage medium. The program executes the steps of the method in the embodiments in the executing process. The storage medium includes: various media capable of storing program codes such as a read-only memory (ROM), a random-access memory (RAM), a disk or a compact disk (CD).

In the indicating method and device for correcting failure of motion-sensing interaction tracking provided by the embodiments of the present disclosure, in the motion-sensing interaction process, by acquisition of the physical space coordinates of the border of the actual motion-sensing interaction range and the physical space coordinates of the key-part points of the human body, in the case of failure of motion-sensing interaction tracking, the current position of the human body relative to the border of the actual motion-sensing interaction range on the ground or the plane parallel to the ground may be obtained according to the physical space coordinates of the border of the actual motion-sensing interaction range and the physical space coordinate of the at least one key-part point from the key-part points acquired in the latest time. The border of the actual motion-sensing interaction range and the distance of the current position relative to the border of the actual motion-sensing interaction range are scaled down and displayed on the display interface in the form of the auxiliary image. Thus, the current position of the human body relative to the border of the actual motion-sensing interaction range may be intuitively given on the basis of the display of the auxiliary image, so that the user can rapidly adjust his/her own position or manually (by the user or other people) the angle of the depth camera is adjusted. Thus, normal motion sensing interaction tracking can be performed. Therefore, the embodiments of the present disclosure can achieve the objective of directing the user to correct rapidly in the case of failure of motion-sensing interaction tracking.

The correcting device for correcting failure of motion-sensing interaction tracking, provided by the embodiments of the present disclosure, may further comprise one or more processors and one or more memories. The processor may process data signals and may include various computing architectures such as a complex instruction set computer (CISC) architecture, a reduced instruction set computer (RISC) architecture or an architecture for implementing a combination of multiple instruction sets. The memory may store instructions and/or data executed by the processor. The instructions and/or data may include codes which are configured to achieve some functions or all the functions of one or more devices in the embodiments of the present disclosure. For instance, the memory includes a dynamic random access memory (DRAM), a static random access memory (SRAM), a flash memory, an optical memory or other memories well known to those skilled in the art.

In some embodiments of the present disclosure, the acquisition module, the processing module, the control module and the read module include codes and programs stored in the memories; and the processors may execute the codes and the programs to achieve some functions or all the functions of the acquisition module, the processing module, the control module and the read module.

In some embodiments of the present disclosure, the acquisition module, the processing module, the control module and the read module may be specialized hardware devices and configured to achieve some or all the functions of the acquisition module, the processing module, the control module and the read module. For instance, the acquisition module, the processing module, the control module and the read module may be a circuit board or a combination of a plurality of circuit boards and configured to achieve the above functions. In embodiments of the present disclosure, the circuit board or a combination of the plurality of circuit boards may include: (1) one or more processors; (2) one or more non-transitory computer-readable memories connected with the processors; and (3) processor-executable firmware stored in the memories.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201610030853.9 filed on Jan. 18, 2016, which is incorporated herein by reference in its entirety as part of the disclosure of the present application.

What is claimed is:
1. An indicating method for correcting failure of motion-sensing interaction tracking, comprising:
acquiring physical space coordinates of a border of an actual motion-sensing interaction range of a human body on a ground and physical space coordinates of one or more key-part points in the human body;

if a failure of motion-sensing interaction tracking is determined, obtaining, on the ground or a plane parallel to the ground, a current position of the human body relative to the border of the actual motion-sensing interaction range based on the physical space coordinates of the border of the actual motion-sensing interaction range and a physical space coordinate of at least one key-part point from the one or more key-part points acquired in a latest time; and scaling down the border of the actual motion-sensing interaction range and a distance of the current position relative to the border of the actual motion-sensing interaction range, and displaying at a preset position of a display interface through an auxiliary image.

2. The method according to claim 1, wherein before performing motion sensing interaction, the method further comprises:

reading a parameter of the auxiliary image, the parameter of the auxiliary image including a position and a size of the auxiliary image, whether the auxiliary image is always displayed, or an automatic disappearing delay time;

displaying the parameter through the display interface so that the parameter is set by a user; and if resetting data of the parameter is received, configuring the parameter of the auxiliary image to be stored as a latest configured parameter; otherwise, exiting setting of the parameter of the auxiliary image.

3. The method according to claim 2, wherein if the parameter of the auxiliary image is set to be always displayed, the auxiliary image is displayed at the preset position of the display interface all the time; or if the parameter of the auxiliary image is set to be not always displayed and the automatic appearing delay time is not zero, the auxiliary image is displayed at the preset position of the display interface within the automatic disappearing delay time; and in a normal process of motion-sensing interaction tracking, the current position of the human body relative to the border of the actual motion-sensing interaction range on the ground or the plane parallel to the ground is obtained based on the acquired physical space coordinates of the border of the actual motion-sensing interaction range and a current physical space coordinate of the at least one key-part point.

4. The method according to claim 1, wherein the step of if a failure of motion-sensing interaction tracking is determined, obtaining, on the ground or the plane parallel to the ground, the current position of the human body relative to the border of the actual motion-sensing interaction range based on the physical space coordinates of the border of the actual motion-sensing interaction range and the physical space coordinate of at least one key-part point from the one or more key-part points acquired in the latest time, includes:

if it is determined that the human body is currently located within the border of the actual motion-sensing interaction range, taking a position of the human body relative to the actual motion-sensing interaction range on the ground or the plane parallel to the ground obtained in the latest time as the current position, based on the physical space coordinates of the border of the actual motion-sensing interaction range and the physical space coordinate of the at least one key-part point from the one or more key-part points acquired in the latest time; and if it is determined that the human body is currently located outside the actual motion-sensing interaction range, calculating a current physical space coordinate of the at least one key-part point in the human body based on the physical space coordinate of the at least one key-part point acquired in the latest time and a moving direction of the human body, and then obtaining the current position of the human body relative to the border of the actual motion-sensing interaction range on the ground or the plane parallel to the ground.

5. The method according to claim 4, wherein the step of if it is determined that the human body is currently located within the border of the actual motion-sensing interaction range, taking a position of the human body relative to the actual motion-sensing interaction range obtained in the latest time on the ground or the plane parallel to the ground as the current position, based on the physical space coordinates of the border of the actual motion-sensing interaction range and the physical space coordinate of the at least one key-part point from the one or more key-part points acquired in the latest time, includes:

obtaining a circular range by taking an average physical space coordinate of the at least one key-part point as a center and taking a maximum moving distance of a common human body within a time period of acquiring each image frame as a radius, based on the physical space coordinate of the at least one key-part point acquired in the latest time; and based on the physical space coordinates of the border of the actual motion-sensing interaction range, if the circular range is located within the border of the actual motion-sensing interaction range, determining that the human body is currently located within the border of the actual motion-sensing interaction range, and taking a position of the human body relative to the border of the actual motion-sensing interaction range on the ground or the plane parallel to the ground obtained in the latest time as the current position.

6. The method according to claim 5, wherein if the circular range is not completely located within the border of the actual motion-sensing interaction range, the method further comprises:

processing an acquired current image line by line, counting a number of points within a maximum moving distance range of the common human body within the time period of acquiring each image frame by taking a preset position in the current image as a center, determining that the human body is currently located within the border of the actual motion-sensing interaction range if a counting result is greater than a preset threshold, otherwise, determining that the human body is currently located outside the border of the actual motion-sensing interaction range, wherein the preset position is a position corresponding to a point on the trunk in an image acquired in the latest time.

7. The method according to claim 6, wherein the step of if it is determined that the human body is currently located outside the actual motion-sensing interaction range, calculating a current physical space coordinate of the at least one key-part point in the human body based on the physical space coordinate of the at least one key-part point acquired in the latest time and a moving direction of the human body, and then obtaining the current position of the human body relative to the border of the actual motion-sensing interaction range on the ground or the plane parallel to the ground, includes:

obtaining a current physical space coordinate of the at least one key-part point in the human body based on the physical space coordinate of the at least one key-part point acquired in the latest time, the moving direction of the human body, and the maximum moving distance of the common human body within the time period of acquiring each image frame; and obtaining the current position of the human body relative to the border of the actual motion-sensing interaction range on the ground or the plane parallel to the ground based on the physical space coordinate of the at least one key-part point in the human body, wherein the moving direction is obtained by comparing the physical space coordinate of the at least one key-part point acquired in the latest time before failure of motion-sensing interaction tracking and a physical space coordinate of the at least one key-part point acquired in a time prior to the latest time.

8. The method according to claim 1, wherein in a case of failure of motion-sensing interaction tracking and after the display of the auxiliary image in the display interface, the method further comprises: sending a message to prompt a user to move.

9. The method according to claim 1, wherein the one or more key-part points of the human body are one or more joint points of the human body.

10. An indicating device for correcting failure of motion-sensing interaction tracking, comprising: an acquisition module, a processing module connected with the acquisition module, and a control module connected with both the acquisition module and the processing module, wherein:

the acquisition module is configured to acquire physical space coordinates of a border of an actual motion-sensing interaction range of the human body on a ground and physical space coordinates of one or more key-part points in the human body;

the processing module is configured to, if failure of motion-sensing interaction tracking is determined, obtain a current position of the human body relative to the border of the actual motion-sensing interaction range on the ground or a plane parallel to the ground based on the physical space coordinates of the border of the actual motion-sensing interaction range acquired by the acquisition module and a physical space coordinate of at least one key-part point from the one or more key-part points acquired in the latest time; and the control module is configured to scale down the border of the actual motion-sensing interaction range acquired by the acquisition module and a distance of the current position relative to the border of the actual motion-sensing interaction range obtained by the processing module, and to display at a preset position of a display interface through an auxiliary image.

11. The device according to claim 10, further comprising a read module connected with the control module, wherein the read module is configured to read a parameter of the auxiliary image before motion sensing interaction, and the parameter of the auxiliary image includes: a position and a size of the auxiliary image, whether the auxiliary image is always displayed, and an automatic disappearing delay time; and the control module is also configured to: display the parameter through the display interface so that the parameter is set by a user; and if resetting data of the parameter is received, configure the parameter of the auxiliary image to be stored as a latest configured parameter, otherwise, exit setting of the parameter of the auxiliary image.

12. The device according to claim 11, wherein if the parameter of the auxiliary image is set to be always displayed, the auxiliary image is displayed at the preset position of the display interface all the time; or if the parameter of the auxiliary image is set to be not always displayed and the automatic appearing delay time is not zero, the auxiliary image is displayed at the preset position of the display interface within the automatic disappearing delay time; and in a normal process of motion-sensing interaction tracking, the processing module is further configured to obtain the current position of the human body relative to the border of the actual motion-sensing interaction range on the ground or the plane parallel to the ground based on the acquired physical space coordinates of the border of the actual motion-sensing interaction range and a current physical space coordinate of the at least one key-part point.

13. The device according to claim 10, wherein the processing module is configured to:

when failure of motion-sensing interaction tracking is determined, if it is determined that the human body is currently located within the border of the actual motion-sensing interaction range, take a position of the human body relative to the actual motion-sensing interaction range on the ground or the plane parallel to the ground obtained in the latest time as the current position, based on the physical space coordinates of the border of the actual motion-sensing interaction range and the physical space coordinate of the at least one key-part point from the one or more key-part points acquired in the latest time; and if it is determined that the human body is currently located outside the actual motion-sensing interaction range, calculate a current physical space coordinate of the at least one key-part point in the human body based on the physical space coordinate of the at least one key-part point acquired in the latest time and a moving direction of the human body, and then obtain the current position of the human body relative to the border of the actual motion-sensing interaction range on the ground or the plane parallel to the ground.

14. The device according to claim 13, wherein the processing module is configured to:

obtain a circular range by taking an average physical space coordinate of the at least one key-part point as a center and taking a maximum moving distance of a common human body within a time period of acquiring each image frame as a radius, based on the physical space coordinate of the at least one key-part point acquired in the latest time; and based on the physical space coordinates of the border of the actual motion-sensing interaction range, if the circular range is located within the border of the actual motion-sensing interaction range, determine that the human body is currently located within the border of the actual motion-sensing interaction range, and take a position of the human body relative to the border of the actual motion-sensing interaction range on the ground or the plane parallel to the ground obtained in the latest time as the current position.

15. The device according to claim 14, wherein if the circular range is not completely located within the border of the actual motion-sensing interaction range, the processing module is further configured to:

process an acquired current image line by line, count a number of points within a maximum moving distance range of the common human body within the time period of acquiring each image frame by taking a preset position in the current image as a center; and determine that the human body is currently located within the border of the actual motion-sensing interaction range if a counting result is greater than a preset threshold, otherwise, determine that the human body is currently located outside the border of the actual motion-sensing interaction range, wherein the preset position is a position corresponding to a point on the trunk in an image acquired in the latest time.

16. The device according to claim 15, wherein if the human body is currently located outside the border of the actual motion-sensing interaction range, the processing module is configured to:

obtain a current physical space coordinate of the at least one key-part point in the human body based on the physical space coordinate of the at least one key-part point acquired in the latest time, the moving direction of the human body, and the maximum moving distance of the common human body within the time period of acquiring each image frame; and obtain the current position of the human body relative to the border of the actual motion-sensing interaction range on the ground or the plane parallel to the ground based on the physical space coordinate of the at least one key-part point in the human body, wherein the moving direction is obtained by comparing the physical space coordinate of the at least one key-part point acquired in the latest time before failure of motion-sensing interaction tracking and a physical space coordinate of the at least one key-part point acquired in a time prior to the latest time.

17. The device according to claim 10, wherein in a case of failure of motion-sensing interaction tracking and after the display of the auxiliary image in the display interface, the control module is configured to send a message to prompt a user to move.

* * * * *

UNITED STATES PATENT AND TRADEMARK OFFICE
CERTIFICATE OF CORRECTION

PATENT NO. : 9,990,031 B2  
APPLICATION NO. : 15/542353  
DATED : June 5, 2018  
INVENTOR(S) : Yingjie Li Page 1 of 1

It is certified that error appears in the above-identified patent and that said Letters Patent is hereby corrected as shown below:

On the Title Page

Under PCT Filed, Item (22):
Please delete "Oct. 21, 2016" and insert the correct filing date of --Jan. 18, 2016--

Signed and Sealed this
Ninth Day of October, 2018

Andrei Iancu
*Director of the United States Patent and Trademark Office*